United States Patent [19]

Leuteritz et al.

[11] 3,728,472
[45] Apr. 17, 1973

[54] MECHANICAL PRESSURE TYPE ELECTRICAL CONNECTIONS FOR TERMINATING AND CONNECTING METALLIC CABLE SHIELDS

[75] Inventors: Raoul H. Leuteritz, Westfield; Attila Dima, Piscataway, both of N.J.

[73] Assignee: General Cable Corporation, New York, N.Y.

[22] Filed: Mar. 31, 1972

[21] Appl. No.: 239,938

[52] U.S. Cl. .................. 174/78, 174/84 R, 339/251
[51] Int. Cl. ............................................. H02g 15/08
[58] Field of Search .................. 174/78, 84 R, 88 R; 339/14 R, 14 L, 251

[56] References Cited

UNITED STATES PATENTS

| | | |
|---|---|---|
| 2,696,518 | 12/1954 | Roehmann et al. .................. 174/78 |
| 3,176,064 | 3/1965 | Browne .................. 174/78 |
| 3,240,868 | 3/1966 | Ets-Hokin et al. .................. 339/14 L X |
| 3,431,349 | 3/1969 | Hamilton .................. 174/78 UX |
| 3,448,430 | 6/1969 | Kelly .................. 174/78 X |
| 3,537,060 | 10/1970 | Tordoff .................. 339/14 R |
| 3,546,365 | 12/1970 | Collier .................. 174/78 |
| 3,564,116 | 2/1971 | Masterson .................. 174/84 R |

Primary Examiner—Bernard A. Gilheany
Assistant Examiner—A. T. Grimley
Attorney—Nichol M. Sandoe et al.

[57] ABSTRACT

This invention is a support formed from a flat strip that is bent around electric cable and that has its ends interlocked to form a short section of tubing which is inserted between the insulation shield and the metal shield that surrounds the insulation shield. It is used at splices and other terminations to support the metal shield so that contact rings, connectors and the like can be clamped to the outside of the metal shield without exerting force on the insulation of the cable. cable.

13 Claims, 7 Drawing Figures

PATENTED APR 17 1973 3,728,472
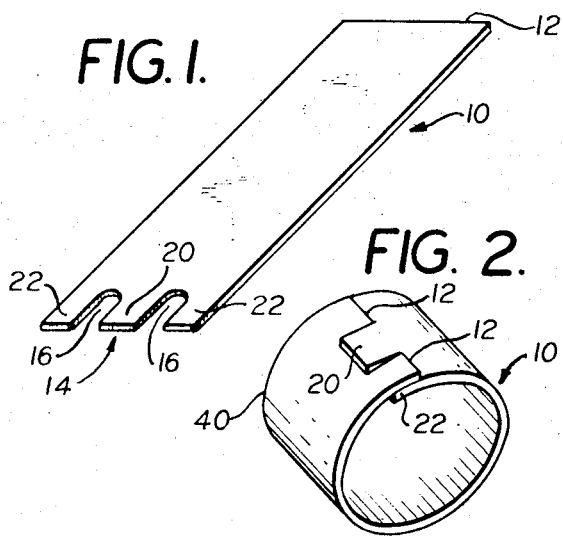
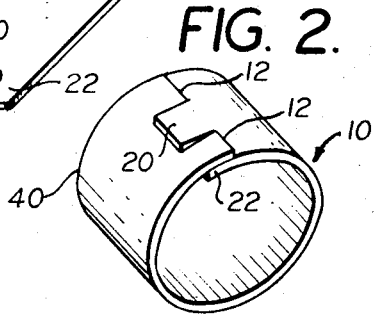
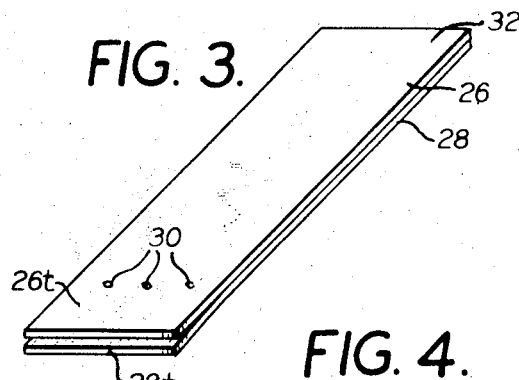
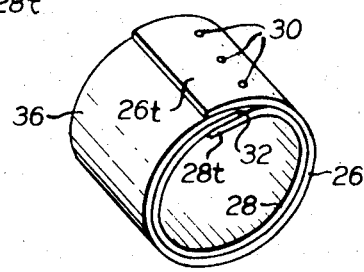
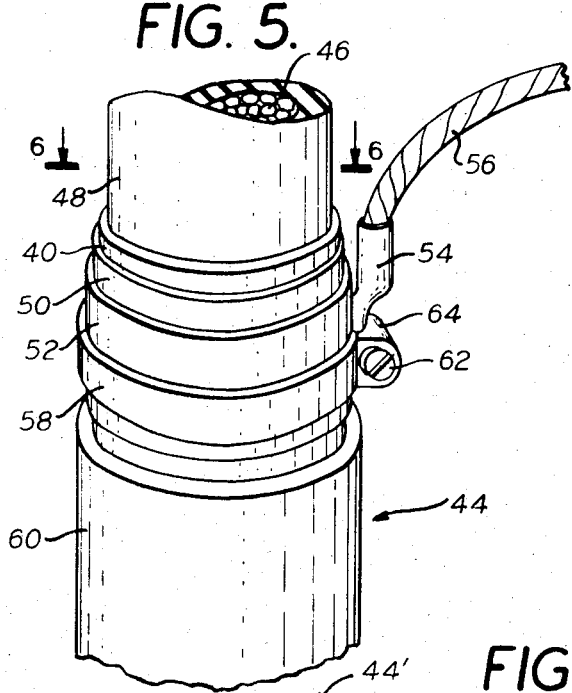
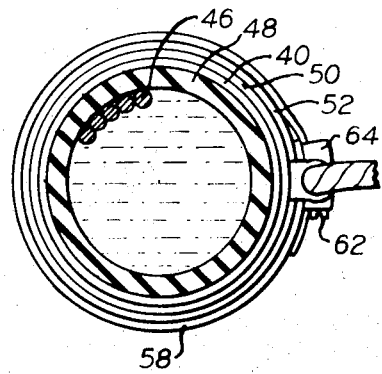
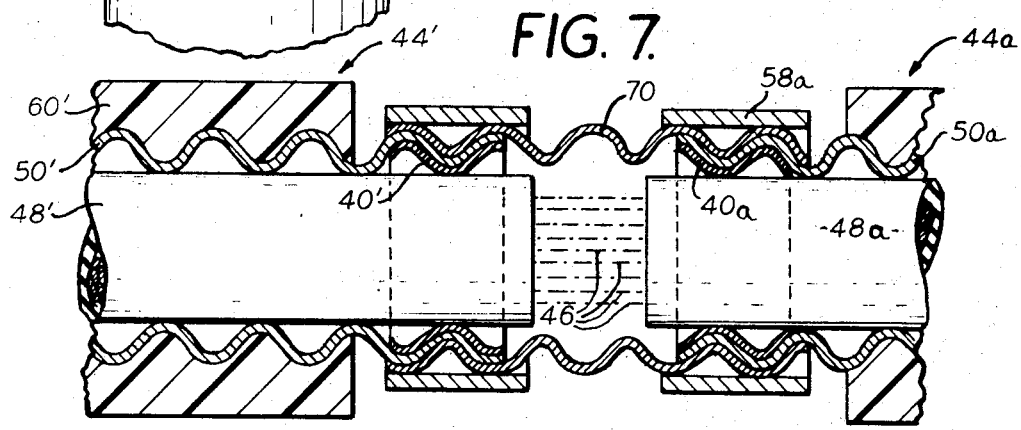

MECHANICAL PRESSURE TYPE ELECTRICAL CONNECTIONS FOR TERMINATING AND CONNECTING METALLIC CABLE SHIELDS

BACKGROUND AND SUMMARY OF THE INVENTION

It is a common practice to apply a metallic shield over the extruded insulation shield of High Voltage solid dielectric insulated cables. The metallic shield is designed to carry a specified fault current during a few cycles of alternating current. In order for this shield to serve its current-carrying function it is essential that it be connected to the power system's ground circuit at cable joints and terminals. The mechanical attachment of such connections is attractive from the standpoint of ease of application under field conditions. One of the requirements of such connections is that they be capable of yielding long-time low resistance contact without maintenance. It is the purpose of this invention to provide such connections on General Cable's new, copper "LC" shield.

It is well known that extruded plastic insulation expands and contracts when it is subjected to temperature changes during load cycling. The same material deforms when it is mechanically restricted during temperature rise. Therefore while the cable core is firm enough to provide initial support for a mechanically clamped connection the core will deform upon heating and the connection will loosen after one or two heat cycles. Upon such loosening the contact resistance becomes very high and the connection becomes thermally unstable when carrying high currents. Therefore the core cannot be used as the support for a mechanically clamped connection on the metallic shields of solid dielectric power cables.

One solution to this problem is to use a solid tube, inserted under the shield, and upon which the shield and connector can be clamped. Such a tube will work satisfactorily provided that it meets the following requirements:

a. Its inside diameter must be enough larger than the cable core so that when the core is fully expanded at its maximum expected temperature there is some small clearance between the core and I.D. of the tube.

b. Its outside diameter must be as small as possible so that it can be gotten inside the shield easily.

c. It should have good conductivity and good contact with the shield so as to contribute to good current carrying capacity and low contact resistance.

d. Its compression strength is great enough to withstand the compressive force exerted upon it by the hose clamp used to clamp the shield and connector together, without buckling or deforming.

While such tubes, or solid rings can be used they present two serious disadvantages:

a. The ring must be placed on the cable before any splicing or terminating is done and cannot be installed or replaced after the splice or termination is completed.

b. Because solid dielectric cables inherently exhibit diameter variations and the ring must match the core diameter quite closely, a very large number of rings of different diameters would be required for even a relatively small number of cable sizes and voltages.

This invention has one or two metal strips of suitable length and width to form a ring of the proper inside diameter when the ends of the strips are locked together by means of the particular end design utilized. When a single metal strip is used to form the compression ring, it is made with two or more notches at one end to produce a mechanical locking. When two strips are used to form the ring, they are put on top of each other and are welded or riveted together with the ends of the two strips diverging from one another at one end for receiving the other end of the connected strips when bent to form a ring.

The rings may be made of flat strip stock and will be so shown in the drawing, but they exhibit greater compressive strength and resistance to buckling if made from corrugated stock in which the corrugations are circumferential in the completed ring, the drawing will also show the use of rings with corrugated stock and illustrate the way in which this locks the parts together against axial displacement.

One of the principal advantages of the invention is that variations in the diameter of the cable presents no problem since the proper ring size can be obtained by simply cutting the strip at the plain end to produce the proper length, and this can be done in the field. Furthermore, the split ring allows application, removal, or replacement of the ring after the cable is spliced or terminated since the ring is split and can be snapped over the cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is an isometric view of a strip for making one of the support rings of this invention;

FIG. 2 shows the strip of FIG. 1 bent to form a ring and with the ends interlocked;

FIG. 3 shows a modified form of the invention in which the strip is made by connecting together two superimposed thinner strips;

FIG. 4 shows the composite strip of FIG. 3 bent into a ring and with the ends interlocked;

FIG. 5 is an isometric view showing the way in which the support ring of this invention is assembled with a cable and a connector which is clamped to the metal shield of the cable;

FIG. 6 is a sectional view taken on the line 6—6 of FIG. 5; and

FIG. 7 is a sectional view showing the support ring made with corrugated stock and assembled with a cable having the metal shield and its connector also made of corrugated stock.

DESCRIPTION OF PREFERRED EMBODIMENT

FIG. 1 shows a band 10 having a plain edge portion 12 at one end and a slotted edge portion 14 at the other end. The slotted edge portion 14 has two slots 16 which extend generally parallel to one another and which are shown in the drawing with curved ends, though the ends can also be made flat at right angles to the sides of the slots 16.

In order to form the flexible band 10 into a ring, the band is bent to a generally circular contour and the plain edge portion 12 is inserted into the slots 16 with the portion of the slotted end which is between the slots located outside of the plain edge portion and the rest of the slotted end located inside of the plain edge portion as shown in FIG. 2. The portion of the band between the slots 16 forms a tab which is indicated by the reference character 20; and the parts of the band beyond the slots 22 form tabs 22.

This construction shown in FIGS. 1 and 2 is the simplest construction using the principle of the slotted end for receiving the plain end. The construction can be modified by having more slots 16 and more tabs 20 with alternating tabs located above and below the plain end portion 12 when the end portions are brought together to make the band into a ring.

If the band 10 is bent to the shape shown in FIG 12, without first bending it to a smaller diameter beyond its elastic limit, the band is held to the FIG. 2 configuration by the pressure of the tab 20 holding the edge portion 12 down so that the band cannot spring open. If the band 10 is rolled around a mandril or other object of substantially smaller diameter than the intended diameter of the ring, and this operation stresses the band so much beyond its elastic limit that it tends to remain in a shape of lesser diameter than the intended diameter of the ring, then the pressure of the plain end portion 12 against the ends of the slots 16 causes the band to maintain the shape shown in FIG. 2. In either case, the ends of the slots 16 or the juncture of these slot ends with the the tab 20 provide abutments for maintaining the band in the ring shape shown in FIG. 2.

FIG. 3 shows a modified construction which comprises an outer band 26 and an inner band 28 connected together by fastening means such as rivets 30. Beyond the rivets 30, the end portion of the outer band 26 can be considered as a tab 26t. The corresponding portion of the inner band 28 forms a tab 28t. These tabs are made to diverge from one another by bending one or both of the tabs 26 and 28.

When the composite band 26 – 28 is to be formed into a ring, the plain edge portion 32 at the end of the composite band opposite to the tabs 26t and 28t, is inserted into the space between the tabs 26t and 28t after bending the composite band to a ring 36 as shown in FIG. 4. The tabs 26t and 28t provide abutments for holding the plain ends 32 in the space between the tabs as shown in FIG. 4.

In the construction of FIGS. 1 and 2, the depth of the slots 16 determines the diameter of the ring formed by the band 10, this ring being designated in FIG. 2 by the reference character 40. In the construction shown in FIGS. 3 and 4, the diameter of the ring 36 is determined by the line at which the clearance between the tabs 26t and 28t becomes equal to the thickness of the free ends 32 of the combined bands 26 and 28 since this limits the extent to which the free ends 32 can be pushed into the clearance between the tabs 26t and 28t.

With both of the rings 36 and 40, therefore, adjustment can be made for a smaller diameter of the ring by merely cutting off a portion of the length of the band parallel to the plain edge 12 or the plain edges 32. Bands are thereby adapted to form rings of smaller diameter to fit the particular cable with which the rings are intended to be used.

The bands 10, 26 and 28 can be made of aluminum or copper or other metal, but aluminum and copper are preferred because they are better conductors of electricity. The band 10 may have a thickness of about 10 to 15 mils, or less for small cables and the bands 26 and 28 can be of lesser thickness since there are two such bands used together and the strength of the ring is the sum of the strength of both bands. The slots 16 in the band 10 need not be of any particular width and they can be made as slits without removing any metal; and when so made, the tabs on opposite sides of the slits are flared out like petals for receiving the plain end 12 between them. For purposes of this disclosure the slots and slits are to be considered mechanical equivalents.

FIG. 5 shows the way in which the ring 10 is used with a cable 45. This cable is shown with a stranded conductor 46 covered by insulation 48 and with a metal shield 50. The support ring 40 is inserted as an inner ring under the metal shield 50 and in contact with the metal shield 50 for preventing that shield from being clamped into close contact with the insulation 48 when a contact ring 52 is applied over the metal shield 50.

A terminal 54 of an electrical lead 56 is soldered or otherwise secured to the contact ring 52 in accordance with conventional practice.

A hose clamp 58 is placed around the outside of the contact ring 52 and is tightened up to hold the contact ring 52 securely clamped to the metal shield 50. The ring 40 prevents this clamping pressure from being transmitted to the insulation 48, as previously explained.

The cable 44 has an outer jacket 60 which is cut back when a splice is to be formed.

FIG. 6 is a cross section through the cable 44 taken on the line 6—6 of FIG. 5. The hose clamp has a screw 62 which operates a worm to tighten the hose clamp band, this being a conventional type of hose clamp. In the illustrated construction, the screw 62 and the worm housing, designated by the reference character 64, are shown in substantial alignment with the terminal 54 of the electrical lead 56. There is some advantages in having these protuberances at the same location since this makes the covering of the splice easier, but so far as the operation of the invention is concerned the screw 62 and housing 64 can be at any angular location around the circumference of the cable.

FIG. 7 shows a cable 44' spliced to another length of cable 44a. These cables differ from the cable 44 in that they have corrugated shields 50' and 50a, respectively. The shields are joined by a metallic connector 70 which is corrugated to match the corrugations of the metallic shields 50' and 50a. This connector 70 is clamped tightly against the outside surfaces of the metallic shields 50' and 50a by hose clamps 58' and 58a.

In order to prevent the pressure of the clamp 58' from being transmitted to insulation 48' of the cable 44', there is an inner support ring 40' pushed into the space between the shield 50' and the insulation 48'. This inner ring 40' operates in the same way as the ring 40 already described in connection with FIG. 5 and may be of the same construction except that it is corrugated to match the corrugations of the shield 50'.

The other end of the connector 70 is clamped tightly against a shield 50a of the cable 44a and this clamping pressure is exerted by a hose clamp 58a. Another inner support ring 40a is placed under the shield 50a to prevent the clamping pressure from the clamp 58a from being transmitted to insulation 48a.

In order to insert the support rings into the shields 50' and 50a of FIG. 7, or to insert the ring 40 of FIG. 5 into the metal shield 50, slits can be cut in the shield running generally lengthwise of the shield and with the angular spacing between the slits close enough to permit the shield to be expanded as much as necessary in a radial direction in order to receive the supporting ring 40', 40a or 40. After the contact ring 52 of FIG. 5, or the connector 70 of FIG. 7, has been clamped against the shield to clamp the shield against the inner support ring, the areas of contact and the friction grip are not affected by the slits which are cut in the shield in order to permit entry of contact ring into the shield.

FIG. 7 shows the strands of the conductor 46 diagrammatically spliced together, but does not show the building up of the insulation around the outside of the shield since this forms no part of the invention and would interfere with the simplified and clearer showing of the invention in the drawing.

The preferred embodiments of the invention have been illustrated and described, but changes and modifications can be made, too some features can be used in different combinations without departing from the invention as defined in the claims.

What is claimed is:

1. In a high tension electric transmission line that has a cable including a conductor, insulation surrounding the conductor, an insulation shield and an outer shield around the outside of the insulation shield and in the circuit therewith, the combination with said outer shield of a support ring located between the insulation shield and the outer shield at a termination of the cable, the support ring being formed from a flexible band having a length greater than the circumference of the insulation shield and having end portions that engage one another to provide a minimum circumference for the ring when the band is bent to form a ring with the ends of the band engaged with one another, the ring being of limited radial thickness that can be inserted between the insulation shield and the outer shield of the cable, an element in contact with the outside of the outer shield and having electric continuity therewith, and a hose clamp that fits over the outer shield and over said element for clamping the outer shield and said element against each other and against the support ring.

2. The combination described in claim 1 characterized by one end of the band being formed with abutments between which the other end of the band extends when the band is formed into a ring, the abutments holding said other end against radial movement and against circumferential movement in a direction that would decrease the diameter of the ring.

3. The combination described in claim 2 characterized by the edge portion of the band at said other end being of the same cross-section as the part of the ring back from said edge portion whereby the diameter of the support ring can be changed by trimming off said edge portion at said other end of the band and without affecting the cooperation of the ends of the band when brought together to form a ring.

4. The combination described in claim 1 characterized by the one end of the band having edge portions in planes that diverge from one another and between which the other end of the band extends to bottom on said end portions at the vertex of a dihedral angle where planes of the diverging end portions intersect at the inner ends of said end portions.

5. The combination described in claim 1 characterized by one end of the band having cuts therein extending inward from the edges of the band, and the material of the band on one side of each cut being bent away from the plane of the material on the other side of the cut to provide angularly related tabs between which the other end of the band engages when the band is formed into a ring.

6. The combination described in claim 1 characterized by the band being made of two strips of material superimposed on one another and connected together to form an integral band, but having portions at one end of the band diverging as they approach that end of the band to form a trough into which the other end of the band extends when the band is formed into a ring.

7. The combination described in claim 1 characterized by the outer shield and the element in electric contact therewith being corrugated with the length of the corrugations running generally circumferentially, and the band being corrugated with the corrugations running generally lengthwise of the band and in position to interlock with the corrugations of the outer shield and said element when the band is formed into a ring and inserted into the outer shield.

8. The combination described in claim 7 characterized by the element in electrical contact with the outer shield being a connector for joining the outer shield with a corresponding outer shield of another length of cable, and said connector extending axially substantially beyond the outer shield of the cable to which it is connected by the hose clamp.

9. The combination described in claim 1 characterized by the insulation shield being a semi conductor and the support ring and outer shield being made of metal that is a good conductor of electricity.

10. The combination described in claim 1 characterized by said element in electrical contact with the outer shield being a contact ring, and an electrical grounding lead connected to the contact ring at a location beyond the side of the hose clamp.

11. The combination described in claim 1 characterized by the conductor, insulation, insulation shield and outer shield being parts of a first cable, a second cable having parts similar to those of the first cable and having the conductor of the first cable connected with the conductor of the second cable, the element in contact with the outer shield being a connector that also contacts with the outer shield of the second cable, and the second cable having a hose clamp securing the connector to the outer shield of the second cable in a manner similar to the clamping of the outer shield to the first cable.

12. The combination described in claim 11 characterized by the outer shields of both cables and the connector having similar corrugations extending generally circumferentially thereof with the corrugations held in engagement with one another by the clamping of pressure of the hose clamps to lock the outer shields of the cables against axial displacement with respect to one another.

13. The combination described in claim 1 characterized by the outer shield being corrugated with the corrugations extending generally circumferentially around the shield, and the support ring being made of corrugated material with the corrugations similar to those of the outer shield and in position to interlock with the corrugations of the outer shield when the ring is inserted into the outer shield.

\* \* \* \* \*